Figure 1:
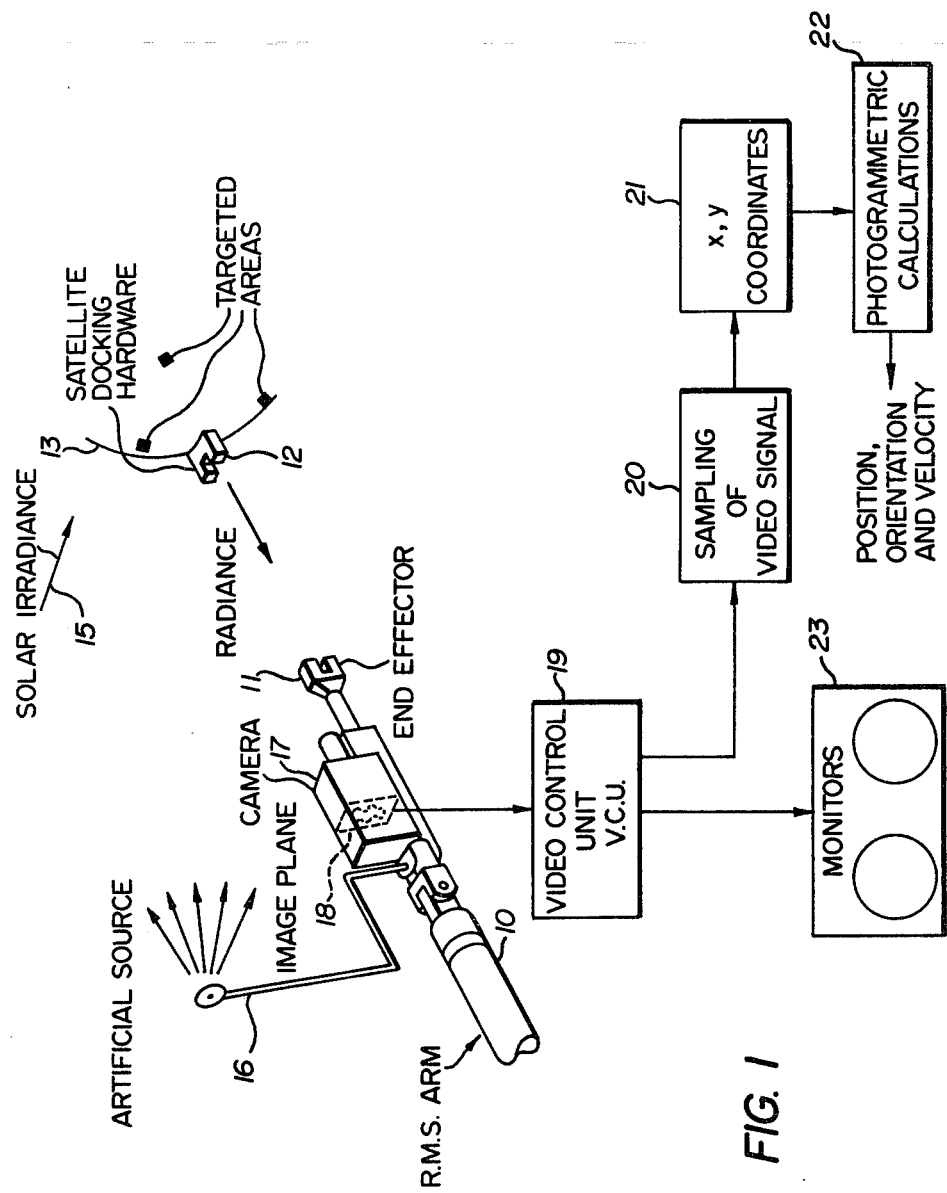

United States Patent [19]

Pinkney et al.

[11] 4,219,847
[45] Aug. 26, 1980

[54] METHOD AND APPARATUS OF DETERMINING THE CENTER OF AREA OR CENTROID OF A GEOMETRICAL AREA OF UNSPECIFIED SHAPE LYING IN A LARGER X-Y SCAN FIELD

[75] Inventors: Harold F. L. Pinkney; Charles I. Perratt, both of Ottawa, Canada

[73] Assignee: Canadian Patents & Development Limited, Ottawa, Canada

[21] Appl. No.: 14,207

[22] Filed: Feb. 22, 1979

[30] Foreign Application Priority Data

Mar. 1, 1978 [CA] Canada ..................... 297965

[51] Int. Cl.$^2$ ........................... H04N 7/18
[52] U.S. Cl. ........................ 358/126; 358/105; 364/559; 244/216
[58] Field of Search ........... 358/125, 126, 105; 250/203 CT; 364/550, 564, 559; 244/3.16

[56] References Cited

U.S. PATENT DOCUMENTS

| | | | |
|---|---|---|---|
| 3,562,423 | 12/1971 | Murphy | 358/126 |
| 3,700,799 | 10/1972 | Stedman | 358/126 |
| 3,786,183 | 1/1974 | Satterfield | 358/126 |
| 4,053,929 | 10/1977 | Collins et al. | 358/126 |
| 4,060,830 | 11/1977 | Woolfson | 358/126 |
| 4,123,017 | 10/1978 | Lewis et al. | 358/126 |

*Primary Examiner*—Robert L. Griffin
*Assistant Examiner*—Edward L. Coles
*Attorney, Agent, or Firm*—J. R. Hughes

[57] ABSTRACT

A method of obtaining on-line data useful in determining the center of area or centroid of a geometrical area of unspecified shape lying in a larger x-y scan field and having its existence indicated by a level discriminated amplitude or intensity or a parameter measurable in the z-dimension comprising; scanning the x-y field in a known raster pattern and obtaining a series of discrete output voltage pulses related to elemental x-y points in the scan field and having an amplitude related to the amplitude or intensity of the said parameter; generating a series of discrete clock pulses related to elemental x-y points in the scan field; obtaining a series of x and y synchronizing pulses from and related to the x-y scan field; establishing in relation to the clock pulses and the x and y synchronizing pulses a smaller x-y scan field in the form of a rectangular window around the geometrical area in the larger x-y scan field, the boundaries as x-y co-ordinates of the said window being known; identifying, from the series of discrete clock pulses, those pulses that coincide with pulses obtained above having an amplitude above a preset voltage level and which fall within the boundaries of the smaller x-y scan field such as to define sample point areas in the geometrical area; making an overall count of the number of pulses identified above, making a count of the number of elemental x-y point each of the pulses identified above are spaced from a boundary of the window in both the x and the y directions to provide x-moment arm counts and y-moment arm counts, and summing the x-moment arm counts and the y-moment arm counts, said counts taken with the count obtained from above providing data for computing the center of area or other mathematical functions of the geometrical area.

1 Claim, 14 Drawing Figures

METHOD AND APPARATUS OF DETERMINING THE CENTER OF AREA OR CENTROID OF A GEOMETRICAL AREA OF UNSPECIFIED SHAPE LYING IN A LARGER X-Y SCAN FIELD

This invention relates to a single camera photogrammetric system for giving position, orientation, and velocity information of an object in space and more particularly to a system for evaluation in real time of a video signal to determine image plane coordinates of targeted contrast elements.

There is at the present time a requirement for a precise automatic system for giving position and orientation information of an object in space such that this information can be used in real time for coupling and docking purposes. This requirement is specifically important in satellite technology where a remotely manipulated arm must couple with other satellite elements. At present these tasks are carried out by direct manual operation by a human operator using his own vision and physical feedback system or by the use of sensor systems involving electro-magnetic and similar techniques.

Figure 2:
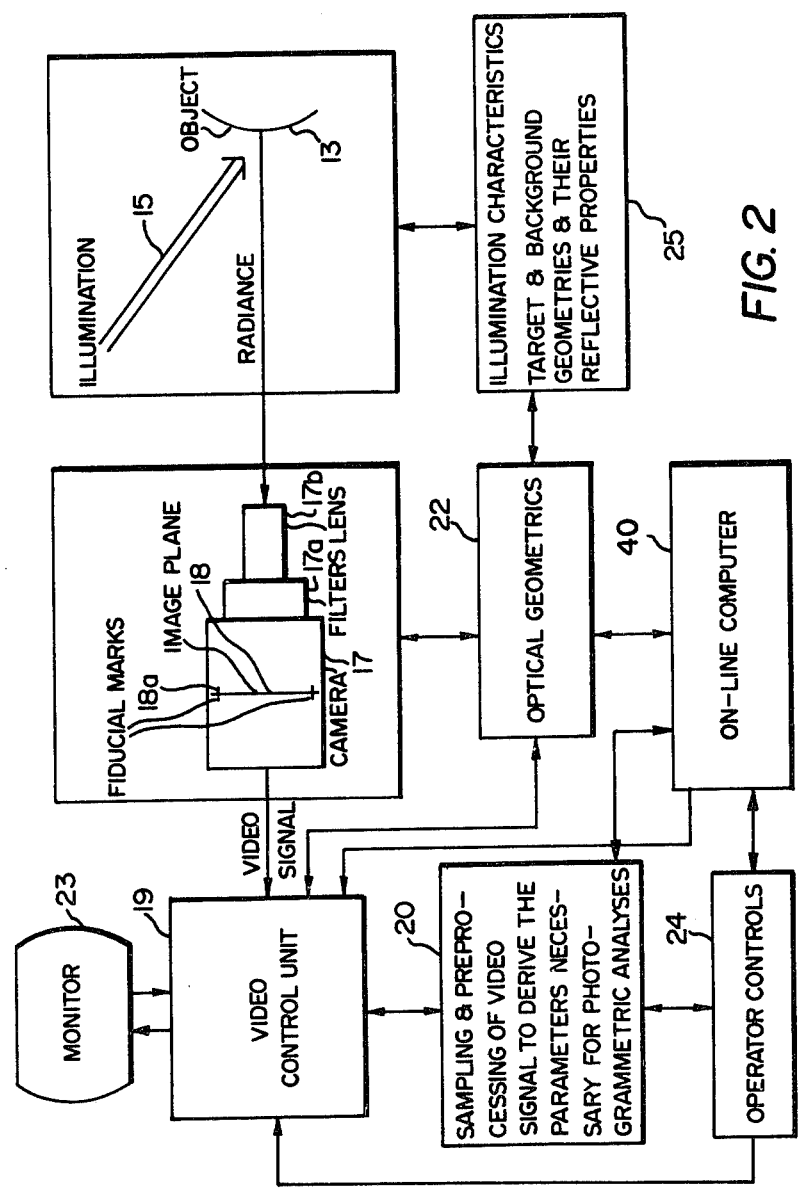
Figure 3:
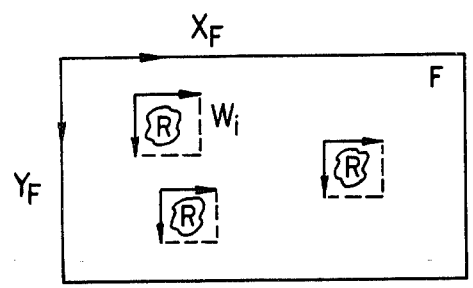
Figure 4:
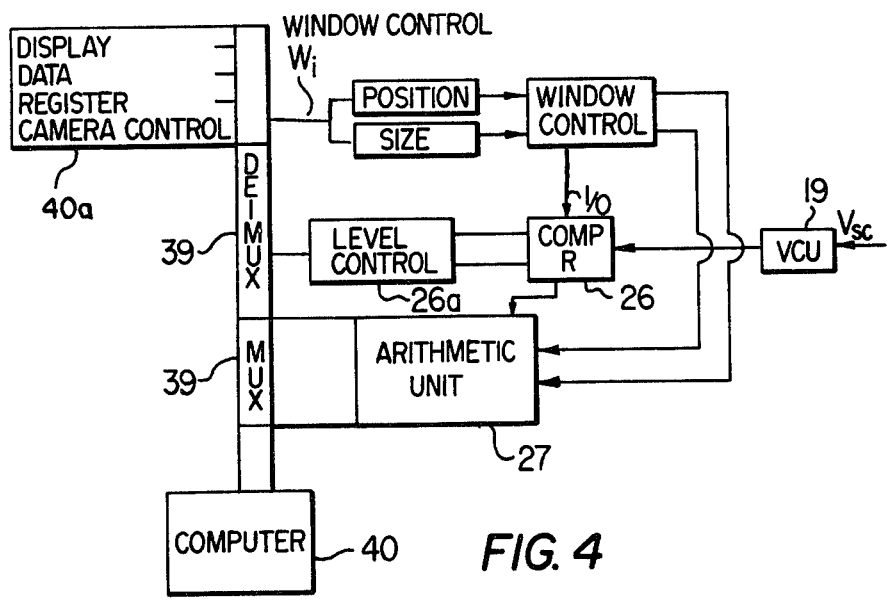
Figure 5:
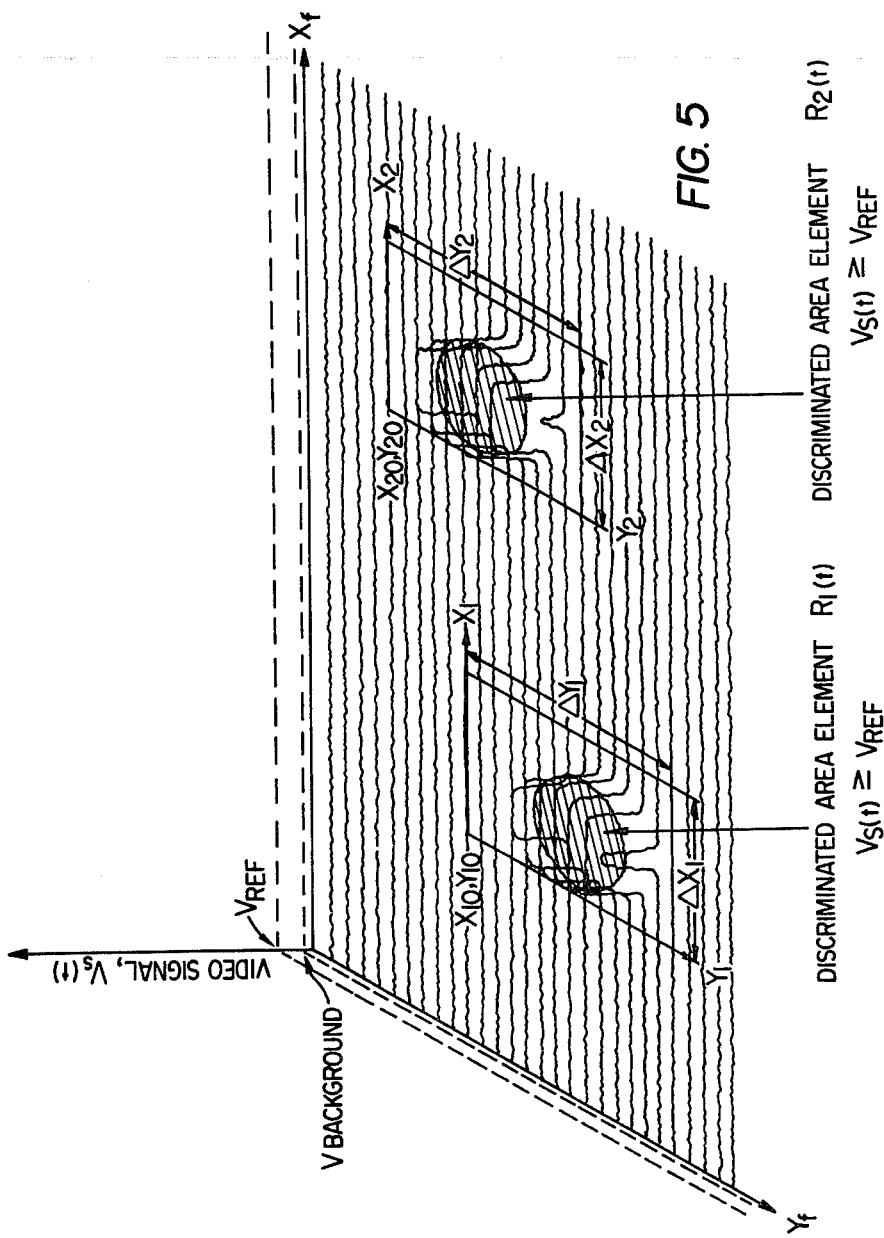
Figure 6:
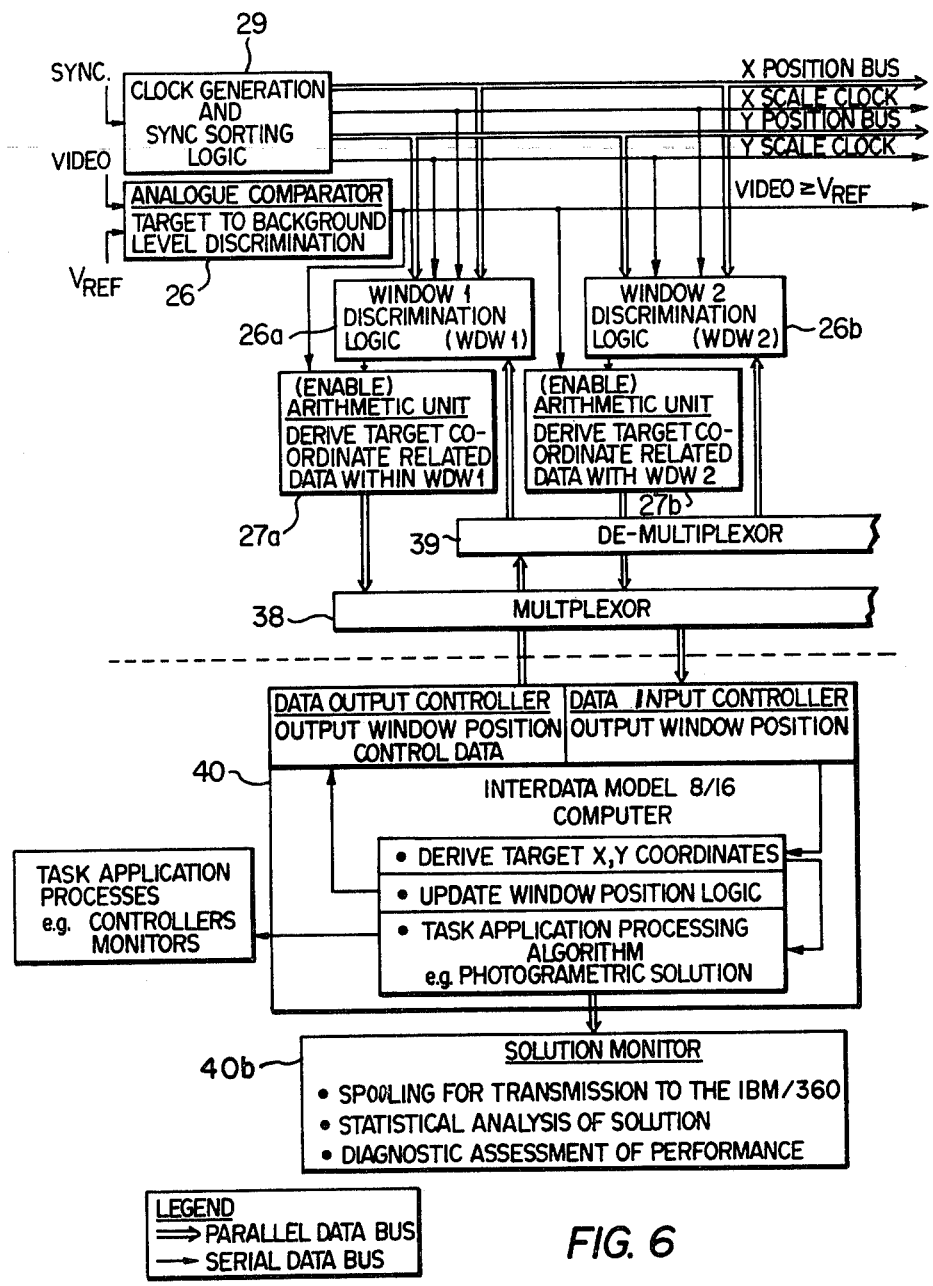
Figure 7:
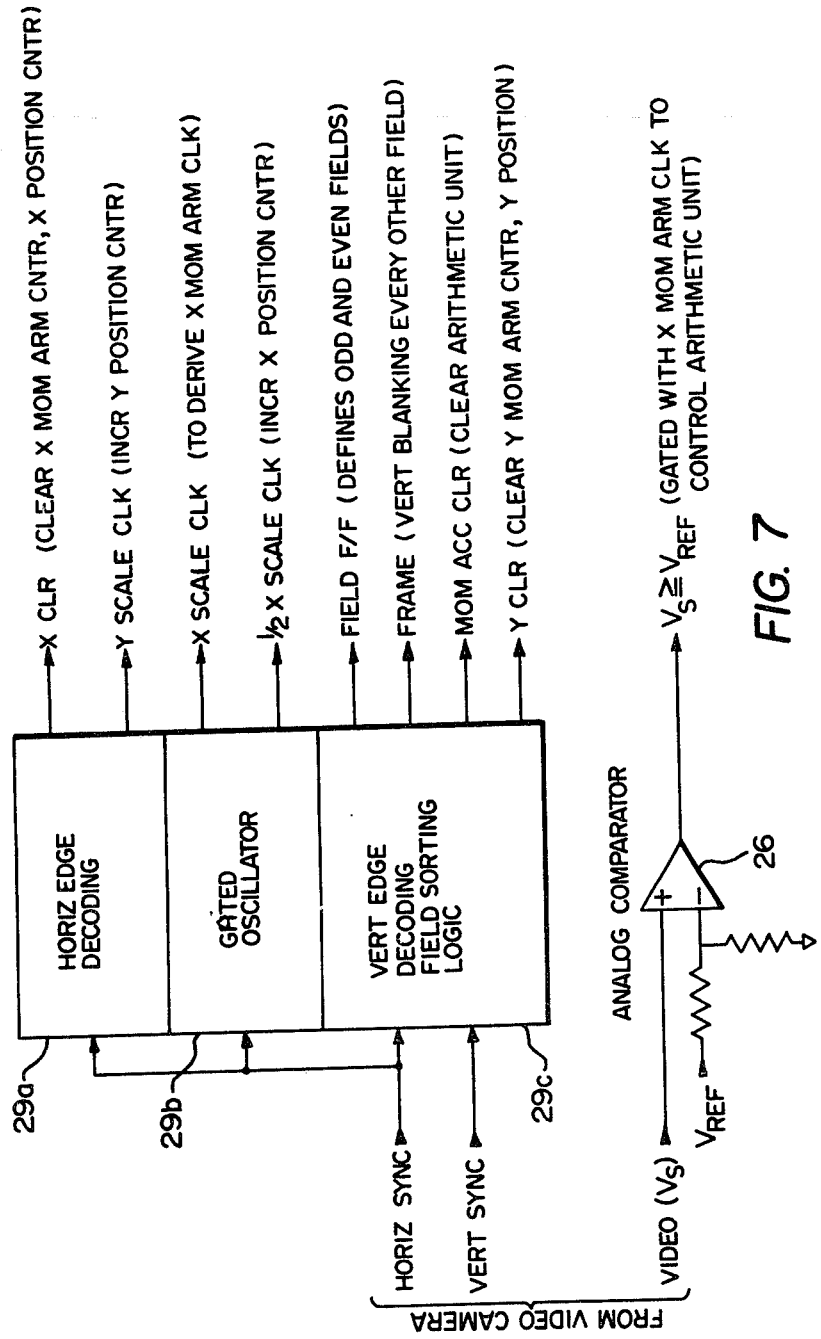
Figure 8:
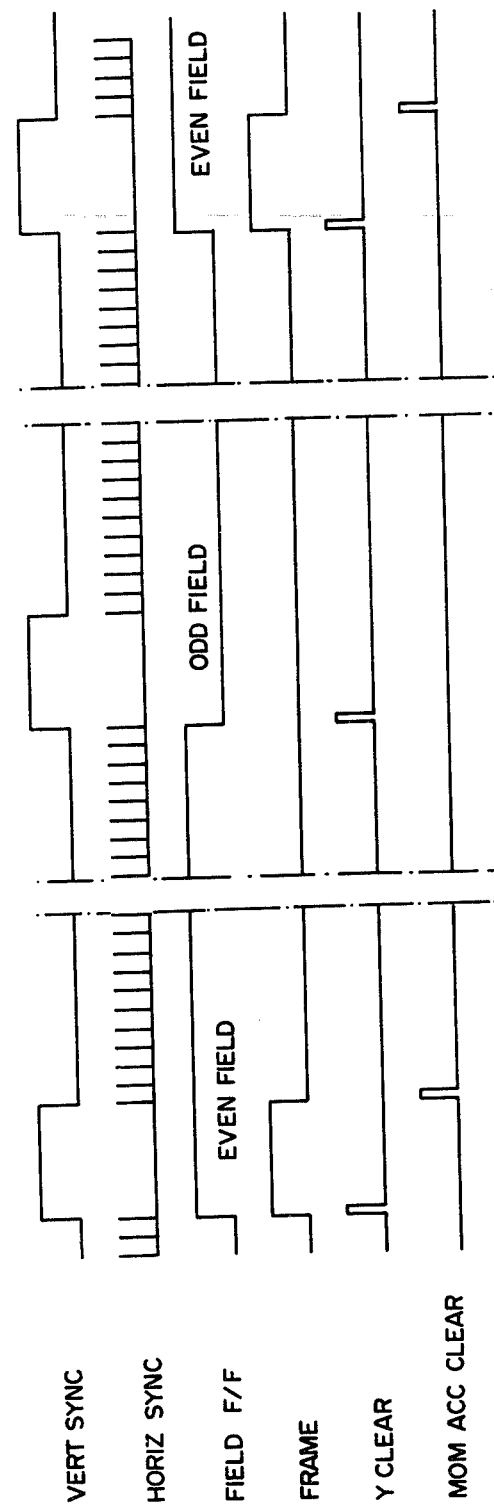
Figure 9:
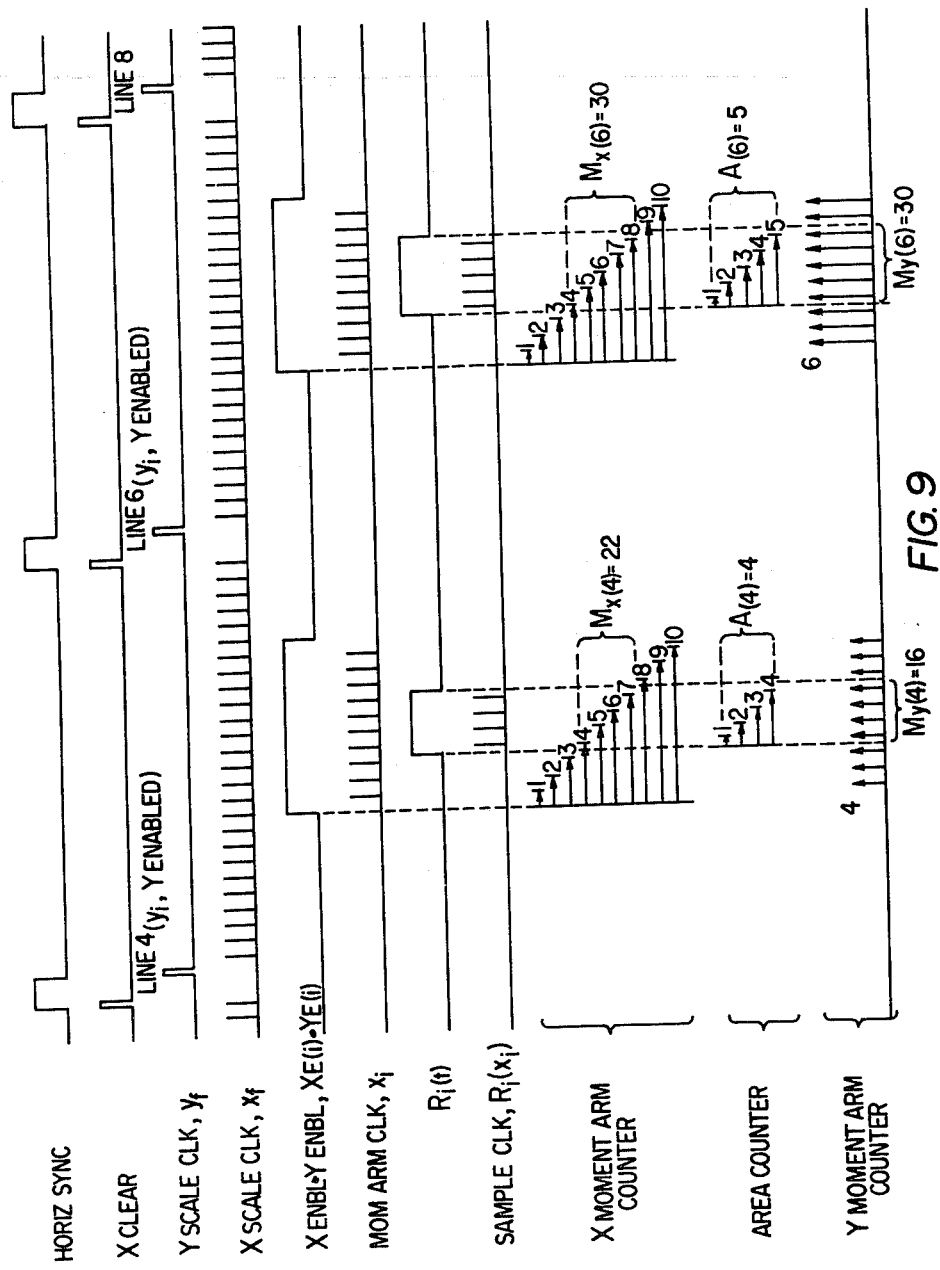
Figure 10:
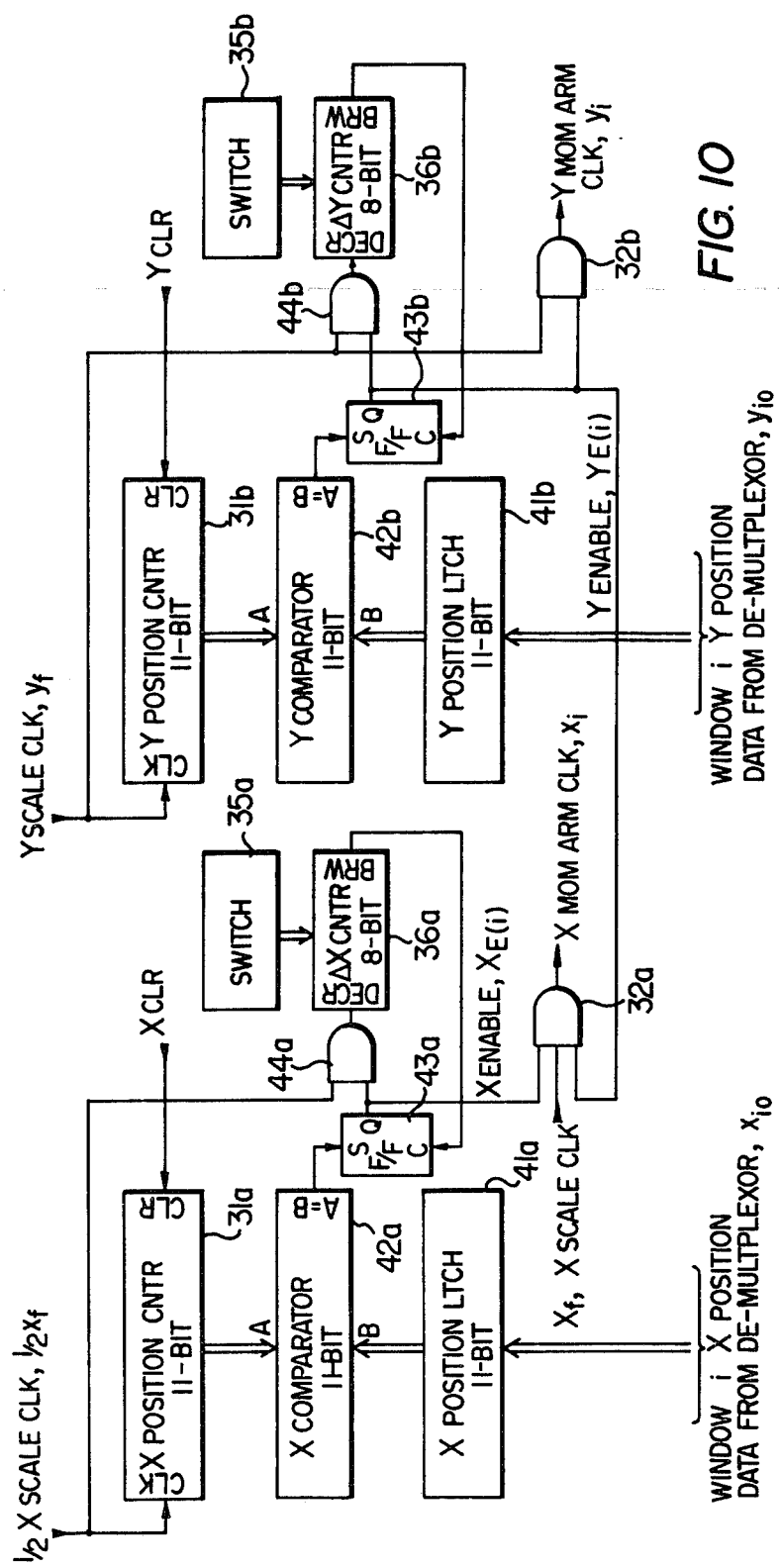
Figure 11:
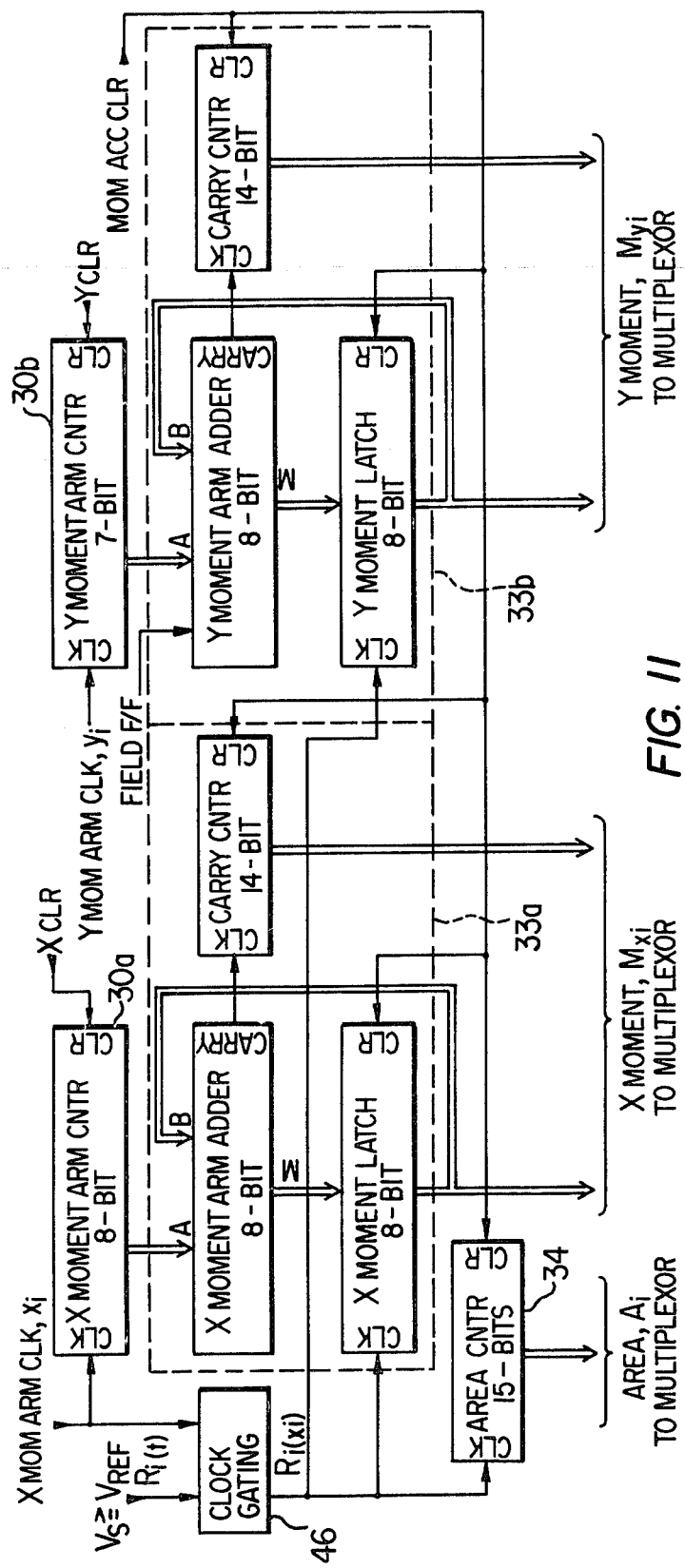
Figure 12:
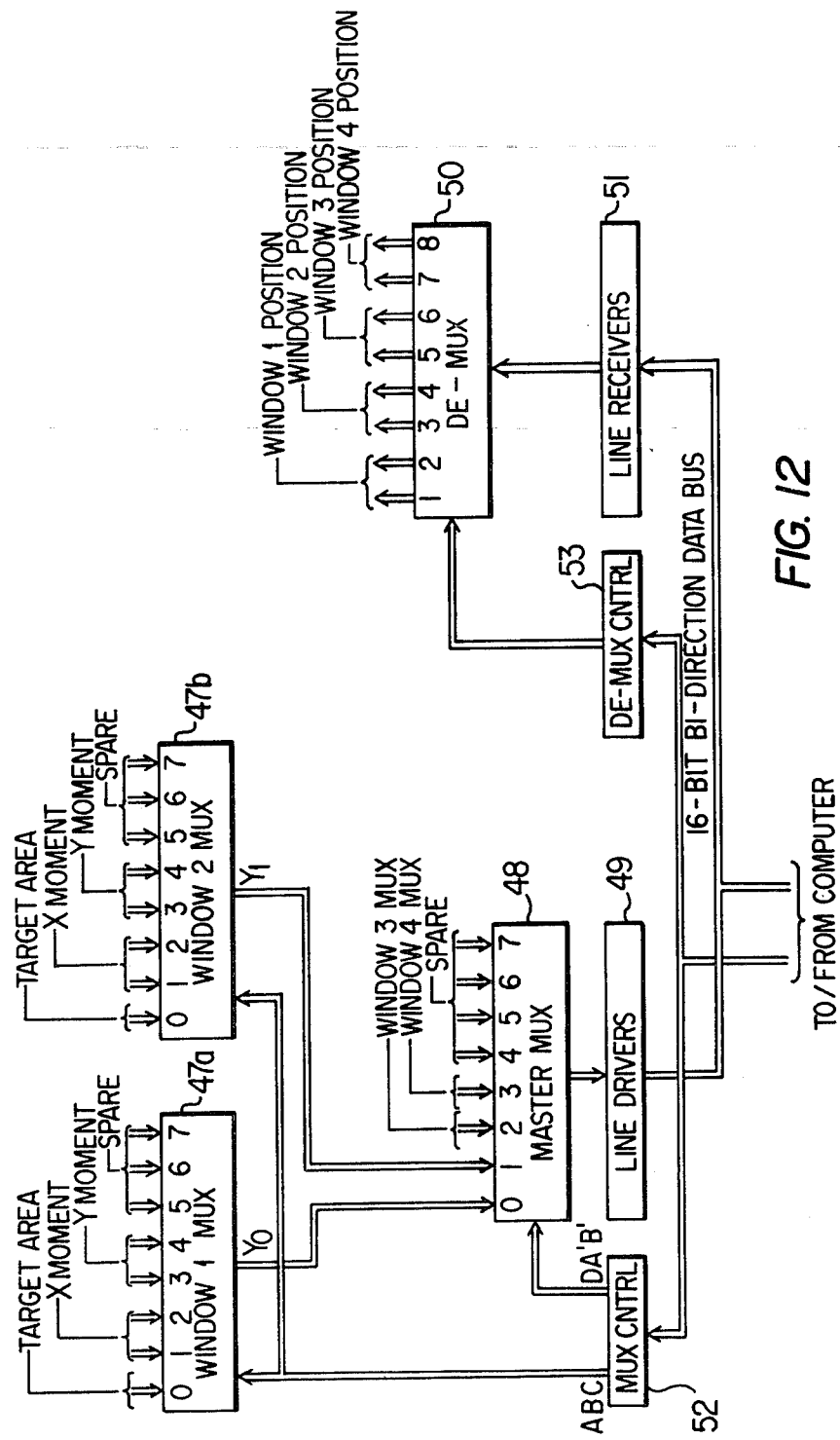
Figure 13:
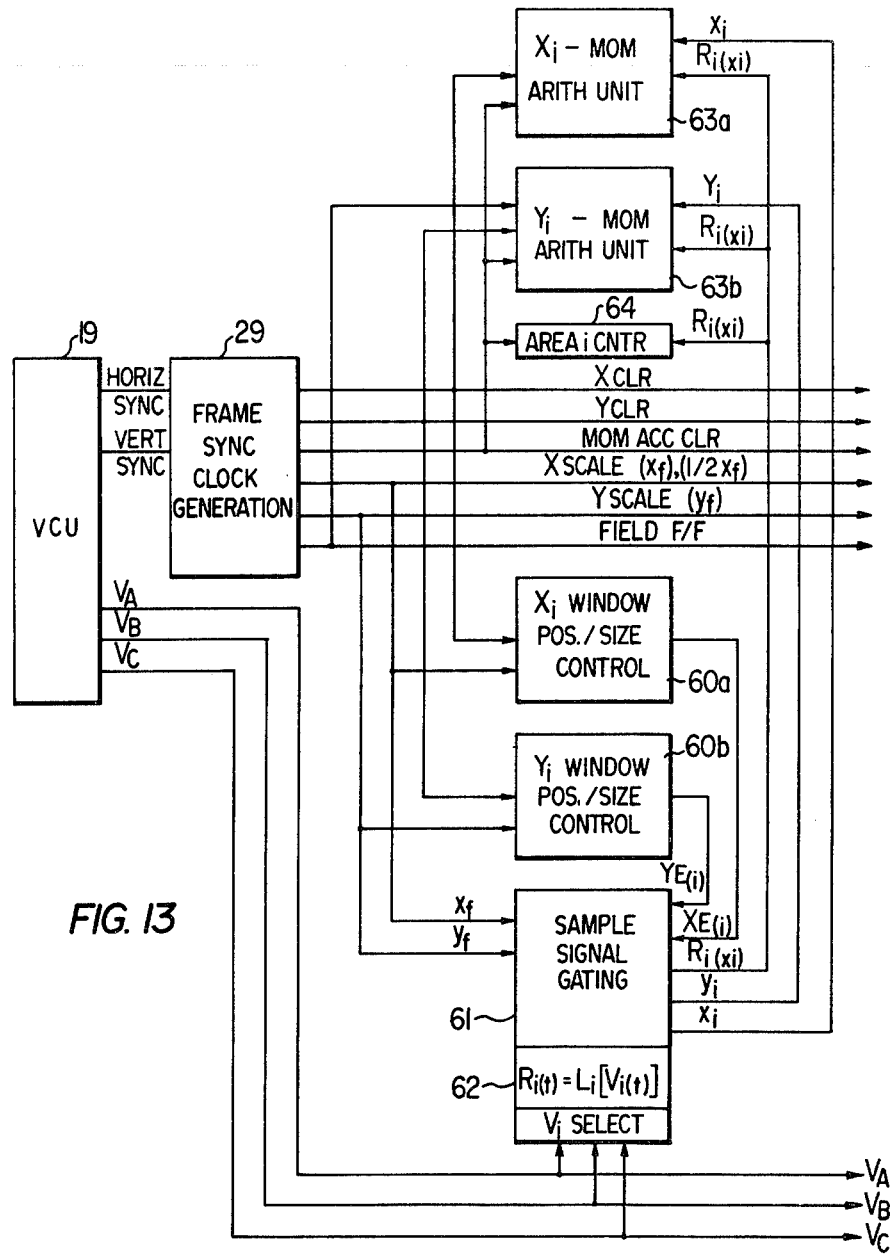
Figure 14:
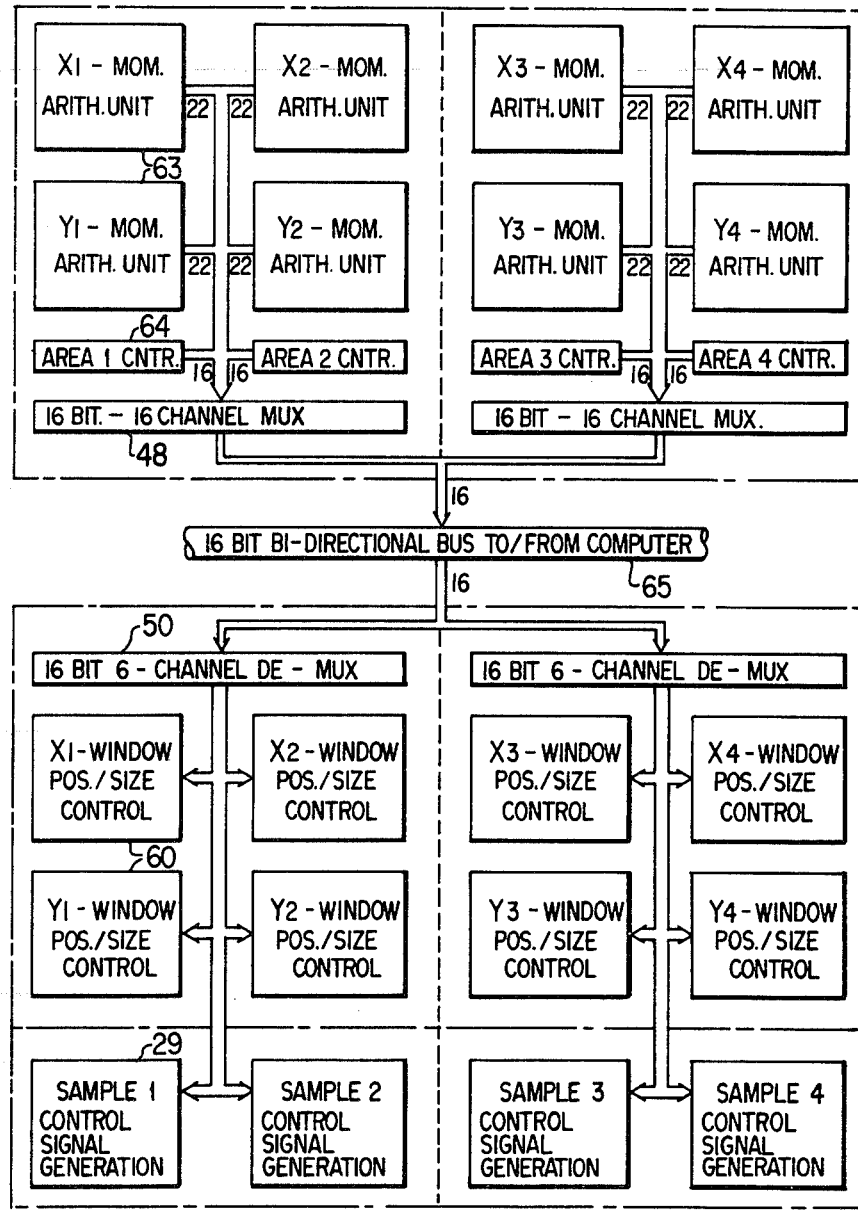

In drawings which illustrate an embodiment of the invention,

FIG. 1 is a diagrammetric of a single camera photogrammetric system,

FIG. 2 is a block diagram of the FIG. 1 system showing the data handling requirements, FIG. 3 is a representation of a scan field "F", FIG. 4 is a schematic of apparatus implementation of an overall system, FIG. 5 shows the raster scanning method of target point identification, FIG. 6 is a more detailed block diagram of the real-time data sampling of the video signal from the scanning function, FIG. 7 gives detail of the clock generation sync sorting and video level discrimination components of FIG. 6, FIGS. 8 and 9 are control logic timing diagrams, FIG. 10 gives detail of the window discrimination logic of FIG. 6, FIG. 11 shows the arithmetic unit of FIG. 6, FIG. 12 gives detail of the data multiplexor and de-multiplexor of FIG. 6, FIG. 13 is a generalized video signal processor control signal flow diagram, and FIG. 14 is a generalized video signal processor data flow diagram.

Referring to FIG. 1, a remote manipulator arm 10, having an effector 11 attached to a remote manipulator arm and operated from there is required to connect with the docking hardware 12 of a satellite 13. The satellite has small targeted areas 14 which are illuminated by solar irradiance 15 and/or by an artificial source 16 on the manipulator arm. The system includes a camera 17 having an image plane 18 which continuously video scans the satellite i.e. the targeted areas and provides a video signal to video control unit 19, a video sampler 20, circuitry 21 for determining the x-y coordinates, and circuitry 22 for carrying out the photogrammetric calculations to provide position, orientation and velocity information of the satellite in relation to the remote manipulator. A monitor 23 is also provided for a human operator. The system is shown in schematic form in FIG. 2 which camera 17 including the necessary filters 17a and lens components 17b and image plane 18 incorporating fiducial (reference) marks 18a. The optical geometrics are passed to circuitry 22 interconnected on-line to computer 23. Operator controls 24 and means for engineering design of target characteristics 25 are provided.

The system described above for FIGS. 1 and 2 involving the photogrammetric resolution of the relative position of three or more known target points as viewed by a camera is known and is described in a paper entitled "A Single Camera Method for the 6-Degree of Freedom Sprung Mass Response of Vehicles Redirected by Cable Barriers" presented by M. C. van Wijk and H. F. L. Pinkney at The Society of Phot-optical Instrumentation Engineers Seminar on Nov. 20–22 1972 at Detroit Mich. A specific stadiametric ranging system is shown in U.S. Pat. No.: 3,653,769 issued Apr. 4, 1972 to John D. Albright.

In using the camera method, the process of measurement requires the use of some defined point (target point). Although the edge of a straight bar mark might be considered, typically a human operator uses the estimated center. For any 2-dimensional shape there is a unique point mathematically defined as the "Center of Area". This point, unlike edge points, is an "invariant" for any orientation of the object. The present invention involves the use of the Center of Area of the target image. This removes the limitations of current approaches, which use edges (rise-time) of pulse) or small bright targets (one-two picture points) (analogous to edge). These are limited to ± one picture point resolution at best and are not as operationally reliable as a C. of A. determination for a larger area image.

The mathematical foundations of the method of the precise location of the Center of Area is now given in reference to FIGS. 3 and 4.

Analytical Formulation of Statistical Measures of Sampling Process (a) Given a frame F (see FIG. 3) defined by $x_f$ and $y_f$ where $0 \leq x_f \leq n_f$
$0 \leq y_f \leq m_f$ and within which $V_s = V_s(x,y)$.

(b) Within F define $R(x,y)$ where $$R(x,y) = 1 \text{ when } V_s \geq V_{ref}$$
$$= 0 \text{ when } V_s < V_{ref}$$

(c) Discretize F by integer substitution into the set of points $x_f: 0 \to n_f$
$y_f: 0 \to m_f$ such that Set F≡all points so defined
then Set R≡all points within F
where $V_s \geq V_{ref}$ (d) Define sub-sets $w_i$ of F by the boundaries $x_{wi} = n_{wi}, \; n_{wi} + \Delta n_{wi}$ $y_{wi} = m_{wi}, \; m_{wi} + \Delta m_{wi}$ Then $R_i$ is the sub-set of R within $w_i$ where $$R_i = 1 \text{ when } V_s \geq V_{refi}$$
$$= 0 \text{ when } V_s < V_{reefi}$$

(e) The statistical measure of $R_i$ in $W_i$ is defined by the moments $M_i^0$, $M_i^1$, $M_i^2$ etc. with respect to the axes $x_{wi} = n_{wi}$ and $y_{wi} = m_{wi}$ Zero Moment $\left\{ M_i^0 = \sum_{x_{wi}} \sum_{y_{wi}} R(x_{wi}, y_{wi}) \right.$ First Moment $\begin{cases} M_{ix}^1 = \sum_{x_{wi}} \sum_{y_{wi}} (x_{wi} - n_{wi}) R(x_{wi}, y_{wi}) \\ M_{iy}^1 = \sum_{x_{wi}} \sum_{y_{wi}} (y_{wi} - m_{wi}) R(x_{wi}, y_{wi}) \end{cases}$ Second Moment $\begin{cases} M_{ix}^2 = \sum_x \sum_y (x_{wi} - n_{wi})^2 R(x_{wi}, y_{wi}) \\ M_{ixy}^2 = \sum_x \sum_y (x_{wi} - n_{wi})(y_{wi} - m_{wi}) R(x_{wi}, y_{wi}) \\ M_{iy}^2 = \sum_x \sum_y (y_{wi} - m_{wi})^2 R(x_{wi}, y_{wi}) \end{cases}$ (f) From the moment data:
Area $= M_i^0 =$ number of points for $R_i$ within $w_i$ $$\text{Centroid } \bar{x}_i = \frac{M_{ix}^1}{M_i^0}, \bar{y}_i = \frac{M_{iy}^1}{M_i^0}$$

Variance about Centroid:

$$\sigma_{xi}^2 = \frac{M_{ix}^2 - M_i^0 \bar{x}_i^2}{M_i^0}$$

$$\sigma_{xy}^2 = \frac{M_{ixy}^2 - M_i^0 \bar{x}_i \bar{y}_i}{M_i^0}$$

$$\sigma_y^2 = \frac{M_{iy}^2 - M_i^0 \bar{y}_i^2}{M_i^0}$$

Implementation of hardwired circuitry is possible to sample video signals from e.g. a video camera and is shown in schematic form in FIG. 4. The x and y sync signals from the camera are used to provide clock and window setting signals to window control logic 28 and the camera output voltage signals ($V_s$) from video control unit 19 are applied to a level comparator 26 settable by level control 26a to provide an output R either 1 or 0 to an arithmetic unit 27. Using the "ordered" form of the "scanner" and the basic oscillator frequency which also generates the integer values of $x_j$, a special hardwired arithmetic unit based on the "generator" forms of the arithmetic algorithm can determine for R the moment data ($M_i^0$, $M_{ix}^1$, $M_{iy}^1$, $M_{ix}^2$, $M_{ixy}^2$, $M_{iy}^2$) on line during the scanned sampling mode. Suitable multiplexor 38 and demultiplexor 39 buses connect to processor 40 and display and control unit 40a.

FIG. 5 shows two target points (target 1, target 2) in a x-y scanning raster with the light intensity of the target spots as it appears to the camera and given an an output video signal ($V_s(t)$) shown in the z-dimension. Windows around the target points having dimensions $\Delta x_1$, $\Delta y_1$ and $\Delta x_2$, $\Delta y_2$ are shown and will be discussed in more detail below. A voltage level (V background) i.e. noise level and reference voltage level ($V_{ref}$) is indicated.

FIG. 6 is the basic functional flow diagram of the real-time data sampling of the video signal shown for two target areas and their associated windows. The circuit may be extended to handle several target areas by the buses i.e. to window "n" logic.

Referring to FIG. 6 and also FIGS. 7, 8, 9, 10 and 11 the output from the video camera ($V_s(t)$) is applied to an analog comparator 26 where it is compared with a set reference voltage ($V_{ref}$) to give an output when $V_s(t) \geq V_{ref}$ which is applied to arithmetic units 27a and 27b. Horizontal and vertical sync signals from the camera are applied to clock generation and sync sorting logic circuitry 29 whose function it is to provide clock timing, clearing, and control signals to later data handling circuits. The output of this circuit appears on an x-position bus and y-position bus which are parallel data lines and also on x-scale clock bus and y-scale clock bus which are serial data lines. This circuit includes horizontal edge decoding logic 29a (FIG. 7) which provides a clearing signal (x CLR) derived from the leading edge of the horizontal sync pulse to clear the x-moment arm counter 30a (FIG. 11) and x-position counter 31a (FIG. 10) and a clock signal (y SCALE CLK) derived from the trailing edge of the horizontal sync pulse which is applied to y-position counter 31b (FIG. 10). The clearing signal is produced once every line scan of the camera. The circuit 29 also controls a gated oscillator 29b which is a voltage controlled oscillator to derive an x-scale clock signal (x SCALE CLK) which in effect is synchronized with the horizontal sync pulse applied to gate 32a (FIG. 10) and a signal ($\frac{1}{2}$x SCALE CLK) applied to x position counter 31a (FIG. 10). The $\frac{1}{2}$ rate of this clock is used because of operational speed constraints of subsequent counters. The circuit 26 also includes vertical edge decoding and field sorting logic 29c. This provides a switching signal (FIELD F/F) that is applied to y-accumulator 33b (FIG. 11) to define odd and even fields and is required because of the interleaved scanning operation of the video camera. This logic also provides a frame pulse (FRAME) derived from the vertical sync pulse during each even field, a clearing signal (MON ACC CLR) derived from the trailing edge of the frame pulse in synchronism with the frame pulse which is used to clear the accumulator 33a and 33b (FIG. 11) and an area counter 34 in the arithmetic unit (FIG. 11, and a clearing signal (y CLR) which is derived from the leading edge of the vertical sync pulse which is applied to y-position counter 31b (FIG. 10) and y moment arm counter 34 (FIG. 11). During the frame pulse period, all data is transferred to/from the computer and the clearing signal clears all counters and accumulators in preparation for the accumulation of data for the next frame.

FIGS. 8 and 9 are control logic timing diagrams and shown the timing relationships of the various control signals. FIG. 8 is the vertical sync related controls and shows the time relationship of the FIELD F/F, FRAME, yCLEAR, and MOM ACC CLR signals. FIG. 9 is the horizontal sync related controls and shows the time relationship of the X CLR, y SCALE CLK, and x SCALE CLK SIGNALS.

The window discrimination logic (28a and 28b of FIG. 6) is shown in detail in FIG. 10. The purpose of this logic is to adjust the size and position of the windows enclosing the target points and to provide appropriate clock signals to the arithmetic unit as shown in FIG. 11. Switches 35a and 35b which may be set by an operator or controlled from the computer connect to counters 36a and 36b and set the window size ($\Delta x$, $\Delta y$) (see FIG. 5). As shown in FIG. 6 the window discrimination logic and the arithmetic units are connected to multiplexor and demultiplexor buses 38 and 39 which connected to computer 40. The computer provides x-position and y-position data to the window position logic which is held in x-position latch 41a and y-position latch 41b and compared in x comparator 42a and y-comparator 42b with the count in x position counter 31a and y position counter 31b. When the inputs to the x comparator or the inputs to the y-comparator are equal a pulse is applied to flip-flops 43a and 43b respectively the outputs of which are used to enable AND gates 44a and 44b respectively which also have x scale clock and y scale clock inputs respectively. The flip-flops also enable the $\Delta x$ (36a) and the $\Delta y$ (36b) counters to be decremented by the x and y clock pulses to zero when a signal is returned to switch the flip-flops. Flip-flop 43a provides a x-enable signal to gate 32a which also has an x-scale clock input and y-enable input from flip-flop 43b and this provides an x moment arm clock signal which is applied to the arithmetic unit. Flip-flop 43b engenders a y-enable signal which is applied to gate 32b along with a y-scale clock input to provide a y-moment arm clock signal which is applied to the arithmetic unit.

FIG. 11 and the lower part of FIG. 9 covers the arithmetic unit in detail. As stated before the x and y moment arm clock pulses are applied to an x-moment arm counter 30a and y-moment arm counter 30b. The counts from these are directed into accumulators 33a and 33b along with the input $V_s \geq V_{ref} = R_i(t)$ from the analog comparator 26 (FIG. 7) after it passes through the AND gate 46. In In effect the accumulators are summing the moment arms (the number of picture points from the edges (e.g. $x_{10}$ and $y_{10}$ of target 1 of FIG. 5) which have a voltage greater than the preset reference level. A straight count of these points is obtained in area counter 34. The pulse timing diagram of FIG. 9 gives an example of how the computation is achieved in regards to scan lines 4 and 6. The summation of the area counters (A) and the x and y moment arm counters ($M_x$, $M_y$) gives for lines 4 and 6:

$\Sigma A = 4 + 5 = 9$ $\Sigma M_x = 22 + 30 = 52$ $\Sigma M_y = 16 + 30 = 46$

This would be continued for the complete scan cycle.

The data from the arithmetic unit (AREA ($A_i$), x MOMENT ($M_{xi}$), y MOMENT ($M_{yi}$) is sent to the computer 40 via multiplexor and de-multiplexor buses 38 and 39 (see FIG. 6). These are shown in more detail in FIG. 12 which shows multiplexor lines for two targets (window 1 mux 47a and window 2 mux 47b) which feed into master multiplexor (master mux) 48 which has facility for several targets and then to the computer via line driver 49. Return data from the computer is applied to the de-multiplexor bus (demux) 50 via line receiver 51. Control signals to/from the computer are transmitted via multiplexor and de-multiplexor control centers 52 and 53 to various components.

FIG. 13 is a generalized (to an i-th target area) video signal processor control signal flow diagram and is similar to FIG. 6 although the latter indicates only a two target area system. As before the video control unit (VCU) 19 provides sync signals to the circuitry 29 for generating the timing and control signals (xCLR, yCLR, MOM ACC CLR, x SCALE ($x_f$, $\frac{1}{2}x_f$); y SCALE ($y_f$), and FIELD F/F. From these, the window control units (60a and 60b) designated as $X_i$—WINDOW POS/SIZE CONTROL and $Y_i$—WINDOW POS/-SIZE CONTROL) derive enabling signals $x_e(i)$ and $y_e(i)$ which are applied to sample signal gating circuitry 61 along with x-SCALE ($x_f$) and y-SCALE ($y_f$) signals. The VCU provides for a multi-component video signal shown here as $V_A$, $V_B$, $V_C$. A selection circuit ($V_i$SELECT) 62 selects from these the appropriate signal for the i-th window logic module. This signal is level discriminated in sample signal gating which gives an output $R_i(x_i)$ along with x-moment arm ($x_i$) and y-moment arm ($y_i$) signals to the arithmetic unit. In the present system a simple comparison of the video signal ($V_s$) versus a reference level ($V_{ref}$) is made but a dynamic reference level may be made to vary under computer control through various levels such as e.g. 10% to 90% which is a form of computer control for the level operator ($L_i$) giving $R_i(t) = L_i(V_i(t))$. The arithmetic unit shown here is divided into an $x_i$-moment arithmetic unit 63a and $y_i$-moment arithmetic unit 63b along with area counter 64 process the incoming signals and provide the necessary outputs to the computer (not shown).

FIG. 14 illustrates a completely generalized video signal processor data flow diagram for a 4 target area system with arithmetic units 63 window control circuits 60, area counters 64, and control signal generators 29 working through multiplexors 48 and demultiplexors 50 into bi-directional bus 65 to/from the computer.

The computer used may be a commercially available unit and provides control, setting of windows and solution of the task applications. For example, if three or more target points are scanned by the video camera then the system can give a photogrammetric solution to the position and orientation of an object in relation to the camera.

We claim:

1. A method of obtaining on-line data useful in determining the center of area or centroid of a geometrical area of unspecified shape lying in a larger x-y scan field and having its existence indicated by a level discriminated amplitude or intensity or a parameter measurable in the z-dimension comprising:
   (a) scanning the x-y field in a known raster pattern and obtaining a series of discrete output voltage pulses related to elemental x-y points in the scan field and having an amplitude related to the amplitude or intensity of the said parameter;
   (b) generating a series of discrete clock pulses related to elemental x-y points in the scan field;
   (c) obtaining a series of x and y synchronizing pulses from and related to the x-y scan field;
   (d) establishing in relation to the clock pulses and the x and y synchronizing pulses a smaller x-y scan field in the form of a rectangular window around the geometrical area in the larger x-y scan field, the boundaries as x-y co-ordinates of the said window being known;
   (e) identifying, from the series of discrete clock pulses, those pulses that coincide with pulses obtained in (a) having an amplitude above a preset voltage level and which fall within the boundaries of the smaller x-y scan field such as to define sample point areas in the geometrical area;
   (f) making an overall count of the number of pulses identified as in (e);
   (g) making a count of the number of elemental x-y point each of the pulses identified in (e) are spaced from a boundary of the window in both the x and the y directions to provide x-moment arm counts and y-moment arm counts; and (h) summing the x-moment arm counts and the y-moment arm counts, said counts taken with the count obtained from (f) providing data for computing the center of area or other mathematical functions of the geometrical area.

* * * * *